US005697625A

United States Patent [19]

Otto

[11] Patent Number: 5,697,625

[45] Date of Patent: Dec. 16, 1997

[54] STABLE CONTAINER, PARTICULARY GARBAGE CONTAINER

[75] Inventor: Willy Otto, Kreuztal, Germany

[73] Assignee: Christoph Henkel, Kreuztal, Germany

[21] Appl. No.: 313,202

[22] PCT Filed: Jan. 27, 1994

[86] PCT No.: PCT/EP94/00223

§ 371 Date: Feb. 21, 1995

§ 102(e) Date: Feb. 21, 1995

[87] PCT Pub. No.: WO94/16973

PCT Pub. Date: Aug. 4, 1994

[30] Foreign Application Priority Data

Jan. 29, 1993 [DE] Germany .......................... 9301247 U

[51] Int. Cl.[6] .......................... B62B 1/10

[52] U.S. Cl. .......................... 280/47.26; 280/47.25; 220/908

[58] Field of Search .......................... 280/47.131, 47.18, 280/47.17, 47.21, 47.22, 47.23, 47.24, 47.26, 47.34, 79.5, 62; 220/338, 908, 608, 623, 633

[56] References Cited

U.S. PATENT DOCUMENTS

| | | | |
|---|---|---|---|
| 1,040,014 | 10/1912 | Rhodes | 220/908 |
| 1,170,797 | 2/1916 | Burroughs | 220/908 |
| 1,173,893 | 2/1916 | Sutcliffe | 220/633 |
| 3,199,711 | 8/1965 | Nurkiewicz | 220/633 |
| 3,568,875 | 3/1971 | Olan | 220/623 |
| 4,231,483 | 11/1980 | Dechenne et al. | 220/608 |
| 4,917,257 | 4/1990 | Edelhoff | 220/908 |
| 5,217,136 | 6/1993 | Sanden, Jr. | 220/908 |

*Primary Examiner*—Richard M. Camby
*Assistant Examiner*—Frank Vanaman
*Attorney, Agent, or Firm*—Birch, Stewart, Kolash & Birch, LLP

[57] ABSTRACT

A garbage container has a body, a bottom and a lid. In the top section of the container, the body has a substantially square cross section, and in its bottom area, a round cross section. The bottom is substantially semispherical. In the lower area of the body, in the direction of the bottom, the square part of the body progressively changes into a substantially round cross section.

7 Claims, 3 Drawing Sheets

STABLE CONTAINER, PARTICULARY GARBAGE CONTAINER

BACKGROUND OF THE INVENTION

1. Field of the Invention

The invention relates to a stable garbage container having a hinged or removable lid comprising more or less upright side walls of substantially non-flexible plastic or steel connected by a bottom.

2. Description of the Prior Art

Garbage containers, e.g. in the sizes 60–80, 120, 140, 210 or 240 liter capacity or more of this kind are fabricated in large numbers and find application to a great extent. For cleaning these garbage containers brushes are normally used; spray cleaning systems which are automatically operated are also in use. Due to the fact that the bottom of the garbage containers is connected to the side walls via a rim, areas result, however, which require a relatively long time to clean or even remain unclean. This applies particularly to the corners of garbage containers having a rectangular cross-section.

SUMMARY OF THE INVENTION

The object of the invention is to simplify and facilitate the possibilities of cleaning garbage containers.

This object is achieved according to the invention by the bottom being connected to the side walls substantially free of any corners and edges.

By avoiding "sharp" transitions e.g. edges or corners in the bottom area, the possibility of cleaning such garbage containers is substantially simplified or facilitated. This applies in particular to the cleaning of garbage containers which are filled with partly fluid or moist garbage.

According to one preferred embodiment of the invention the side walls are elongated beyond the bottom and the free rims of the side walls configured at least in part as a stable support.

Garbage containers are usually substantially higher than they are wide and thus have correspondingly upright side-walls. However, stable standing of the garbage container must be assured in any case.

Especially if the garbage container has a round or more or less round cross-section, the bottom may be configured semi-spherical or approximately semi-spherical.

If the garbage containers have a rectangular or more or less rectangular cross-section the bottom may be configured barrel-shaped. In any case it must be avoided that any edges or corners result or are provided in the area of the bottom which would hamper the possibility of cleaning correspondingly. It must thus always be assured that a smooth transition from the side wall or side walls to the bottom is provided and that no corners or edges exist in the area of the bottom.

In accordance with one particularly preferred embodiment of the invention the container is provided with at least two wheels; the elongated side walls may be reinforced in the area of the wheel axles.

Beneath the barrel-shaped bottom supporting feet or stand ledges are expediently provided which may be ring-shaped.

If the garbage container is provided with a lid substantially square in shape and a body part, the upper edge of which is correspondingly formed, the cross-section of the body part may make a transition into a substantially round cross-section in the direction of its bottom.

Especially in the above embodiment just described the bottom may be configured more or less semi-spherical in its longitudinal section.

It is also possible that the bottom has a round recess and a center hump in the direction of the lid. In some cases it may be expedient to provide the bottom with a lockable drain opening.

The two wheels may be expediently located outside of the cross-section of the body part; however, the two wheels may also be located in indented rims of the body part.

The abutments holding the axle of the two wheels may be formed integral with the body part.

BRIEF DESCRIPTION OF THE DRAWINGS

Several example embodiments of the invention are illustrated greatly schematicized in the drawing; these are described in more detail in the following. In the drawing.

DESCRIPTION OF THE PREFERRED EMBODIMENTS

Figure 1:
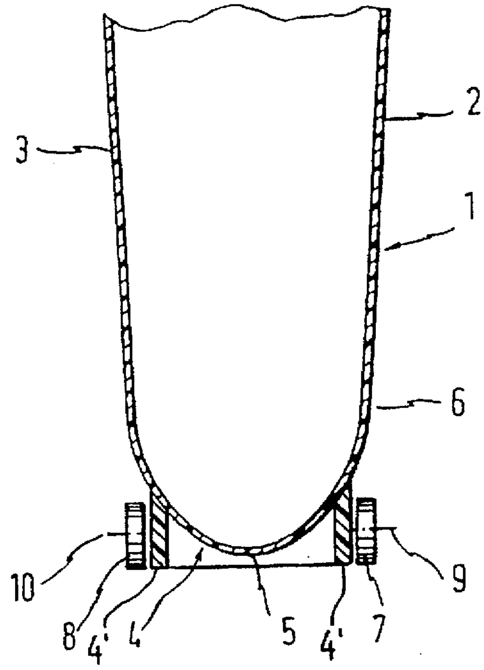
FIG. 1 is a longitudinal cross-section through one embodiment of the invention.

A garbage container 1 of rectangular cross-section and a capacity of e.g. 120 or 140 liters has a rectangular—mostly square—cross-section and is made of synthetic resin. The garbage container may also be provided with strainer inserts or other inserts; the height of such a garbage container amounts to approx. 1.0 m.

The two side walls 2 or 3 opposing each other in longitudinal cross-section are connected together by a bottom 4: this bottom is configured barrel-shaped and has a curvature 4 facing away from the lid.

The bottom has a smooth transition 6 to the side walls which relates to the transitions in the corresponding corners (not shown). In these corners too, a smooth transition is provided from the neighboring side walls to the bottom 4. In any case all and any edges, corners and the like are to be avoided at these transitions to eliminate the disadvantages of difficult cleaning on known garbage containers. In this respect it is to be taken into account that any edges in the thickness of the material used in longitudinal section which may possibly result from application of the bottom are not edges which could hamper cleaning of the garbage container. Even when a more or less smooth transition is to be understood under edgeless, the aforementioned "edges" come under the above term "edgeless".

The garbage container 1 has two wheels 7 and 8 so that after tilting, the garbage container can be run on the ground on these two wheels.

The side walls 2 and 3 and at least one side wall to be imagined in the plane of the drawing (not shown) are elongated towards the ground and form a U-shaped stand for the garbage container 1 to make for stable standing. In the region of the wheel centers 9 and 10 the elongated side walls 2 and 3 are suitably reinforced at 4' to receive the wheel axle.

Figure 2:
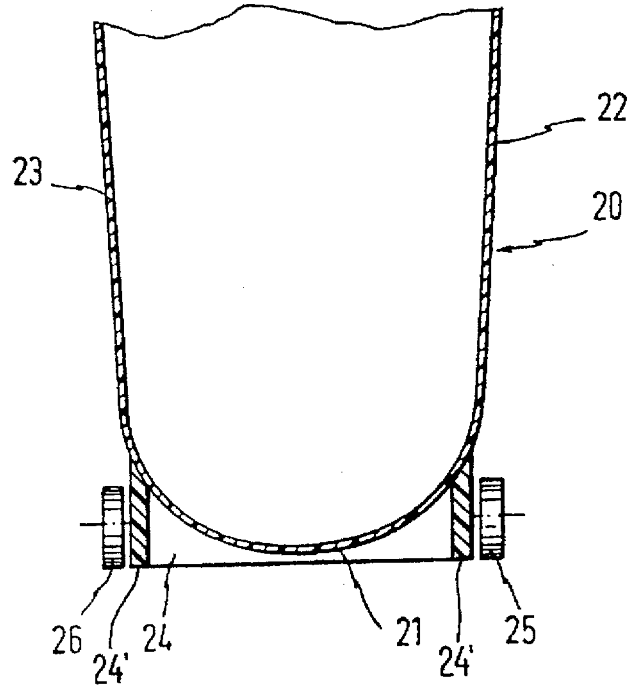
FIG. 2 is a longitudinal cross-section through two modified embodiments of the invention.

According to the embodiment of the invention illustrated in FIG. 2 a garbage container of rectangular cross-section, made of synthetic resin, for a capacity of 1.1 cbm is provided with a barrel-shaped bottom 21 have practically no transition to the corresponding side walls 22 and 23; this applying also to the side walls opposing each other in the imagined plane of the drawing. The barrel-shaped bottom 21 is integral with the side walls 22, 23 and the two side walls (not shown), the bottom section extending more in the corresponding corners between the side walls than in the intrinsically linear region of the side walls.

The side walls 22, 23 and at least one side wall in the imagined plane of the drawing (not shown) are elongated in the direction of the ground so that their free edge 24 running linearly on all sides serves as a stable surface for the stable garbage container 20. In the region of the two wheels 25 and 26 respectively or of their axle, provided in this case, the rim sections 24' of the side walls 22, 23 are reinforced.

Since garbage containers e.g. for 1.1 cbm are usually provided with four wheels this eliminates the need for elongating the side walls 22, 23 and the two side walls (not shown). Then it must be merely ensured that the four wheels are connected to the bottom or the side walls to provide for stable standing of the garbage container 20.

Figure 3:
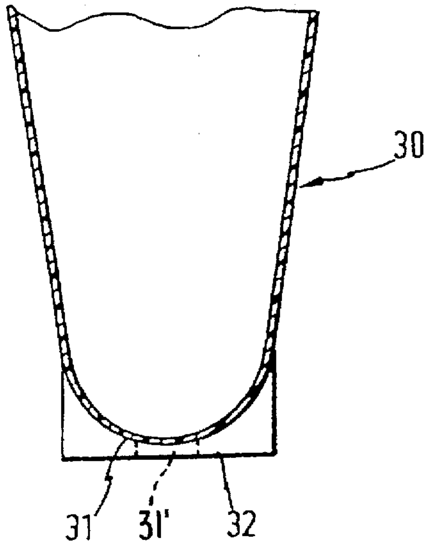
FIG. 3 is a longitudinal cross-section through a further embodiment of the invention.

The garbage container 30 of synthetic resin illustrated in FIG. 3 has a round cross-section and a correspondingly more or less semi-spherical bottom 31.

The round cross-section side wall is elongated in each case down to its free rim 32; this free rim 32 forms the surface for stable the garbage container substantially provided with upright walls; the garbage container may have a lockable opening 31' in the bottom.

Figure 4:
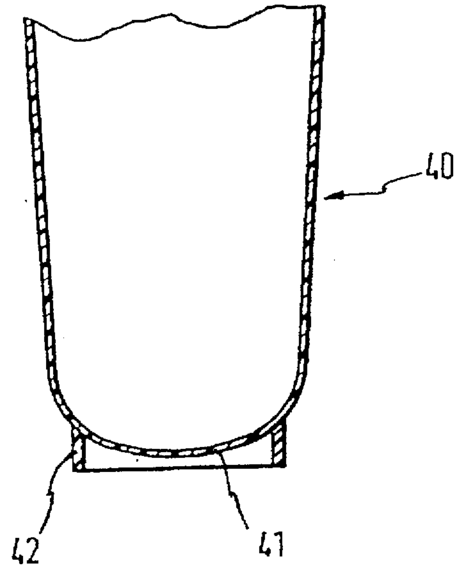
FIG. 4 is a longitudinal cross-section through a fourth embodiment of the invention.

In the embodiment shown in FIG. 4 the synthetic resin garbage container 40 for a capacity of e.g. 60 liters and having a round cross-section is provided with a semi-spherical bottom 41 or a corresponding bottom section and has a corresponding bottom section, the bottom featuring a ring-shaped stand ring 42 provided on the bottom. This stand ring must not necessarily have the diameter of the garbage container above the bottom or the bottom section, but it may also have a smaller diameter.

Instead of the ridge-shaped stand of the aforementioned garbage container it is, of course, possible to also provide feet on the bottom or section thereof to ensure stable standing.

Figure 5:
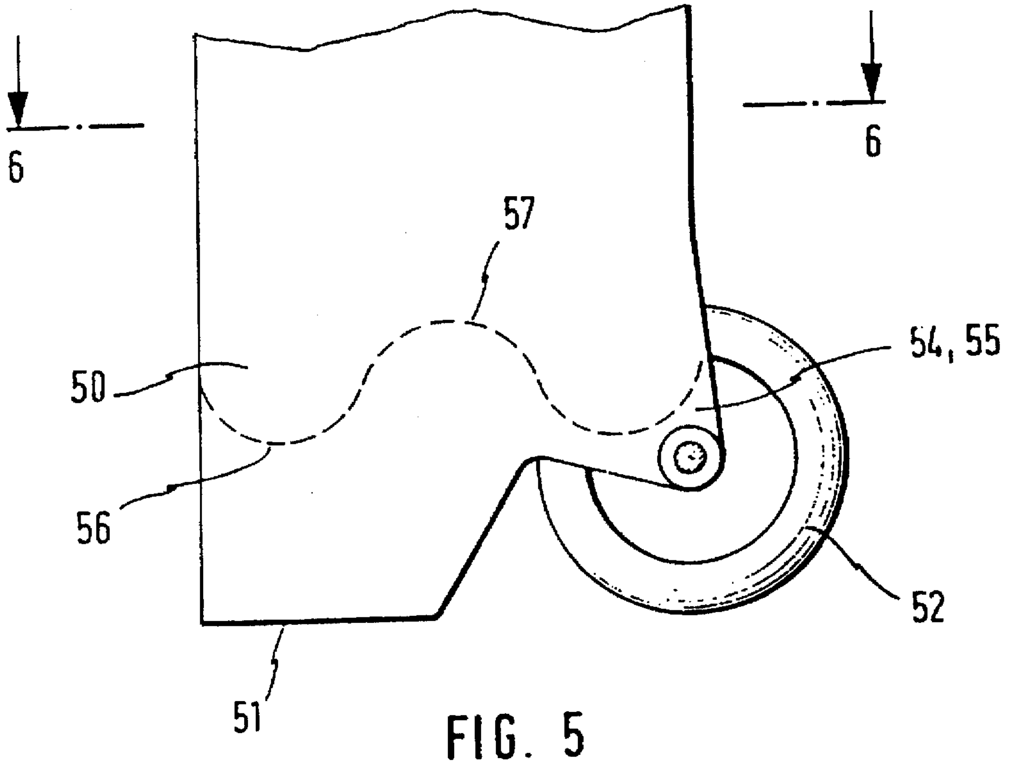
FIG. 5 is a longitudinal cross-section through a fifth embodiment of the invention and FIG. 6 is a cross-section through this embodiment in the lower region of the body part.
Figure 6:
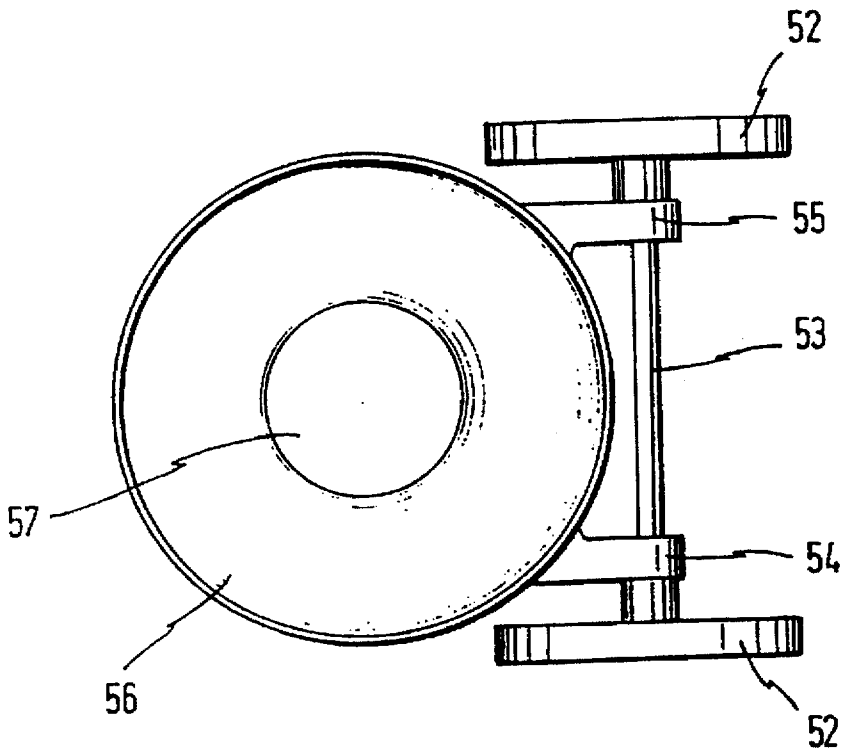
Figure 7:
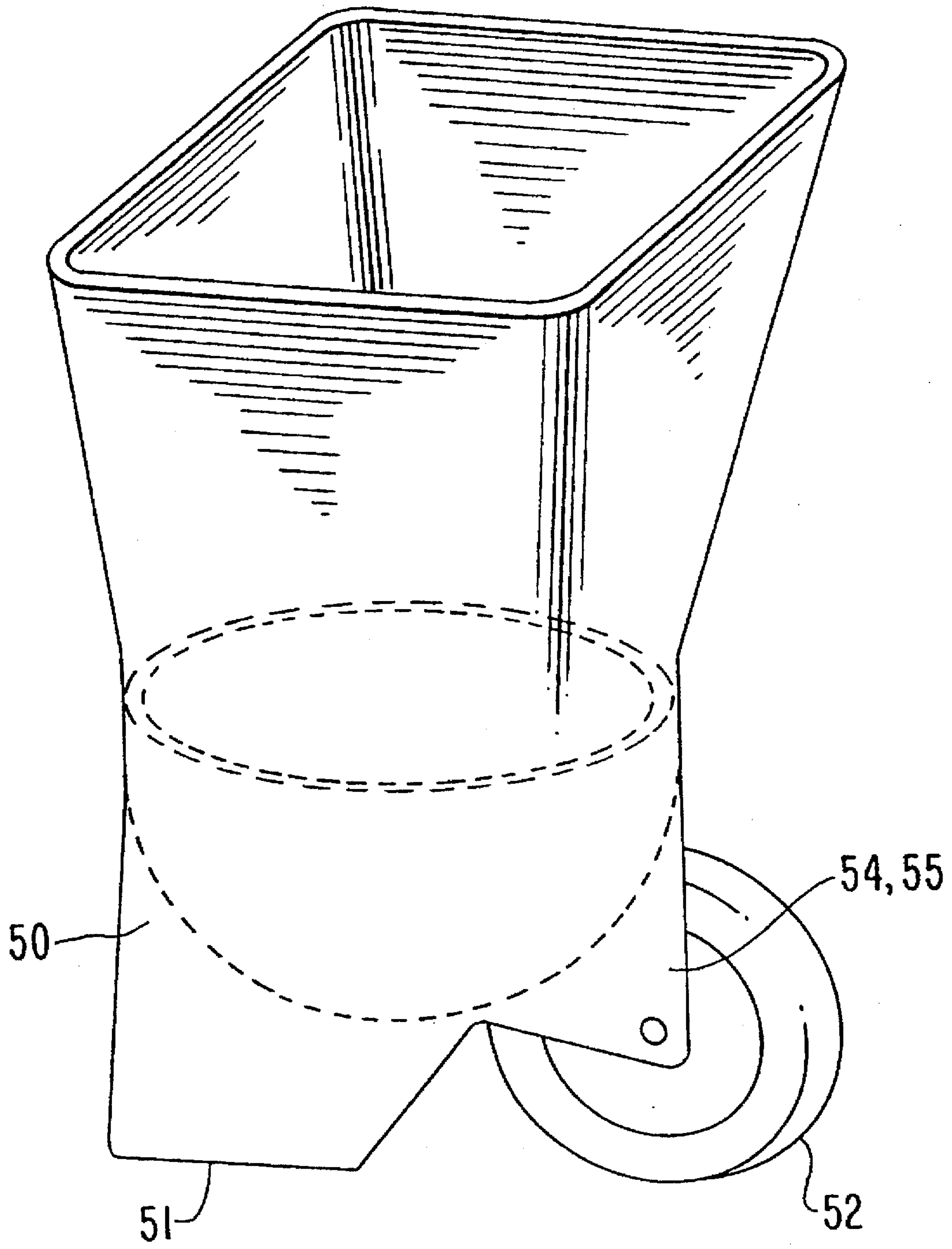
FIG. 7 is an isometric drawing showing the shape of the container.

As regards the garbage container illustrated in FIGS. 5 and 6 only the lower section of the body part 50 is illustrated. Whilst the upper section of the body part has a square cross-section in keeping with the shape of the lid, it has in the area of the transition to the lower section a round cross-section. The free stand rim 51 of the garbage container is angled and has a cutout in the region of the wheels 52.

The axle 53 of the two wheels 52 is mounted in the projections 54, 55 which are formed integral with the body part 50. The bottom may be expediently shaped more or less semi-spherical.

In the embodiment illustrated, however, the bottom has a ring-shaped recess 56 which is more or less semi-circular in cross-section. In the middle of the bottom a hump 57 is provided, the longitudinal section of which is more or less semi-circular and is curved inversely to nest the curve of said hump.

The body part according to the invention may be employed for all kinds of garbage containers and thus also for e.g. so-called biorefuse containers and the like, it also being possible to apply the invention to garbage containers made of steel.

What is claimed is:

1. A stable garbage container having a hinged lid, said container comprising substantially upright side walls of substantially non-flexible plastic or steel connected by a bottom, said container comprising a top section having a substantially square cross section and comprising a bottom section having a round cross section; wherein said side walls have a progressively changing shape from said square cross section to said round cross section; said bottom comprising a semi-spherical lower extension of said bottom section wherein said bottom is connected to said side walls substantially free of any corners and edges.

2. The container as set forth in claim 1 characterized in that said side walls are elongated beyond said bottom and form downwardly depending free rims, said free rims forming a stable support for said container.

3. The container as set forth in claim 2, further comprising a pair of wheels attached to said free rims.

4. The container as set forth in claim 3 further comprising an axle attaching each of said wheels to said free rim wherein said free rim further comprises a reinforced thickness to receive said axle.

5. A stable refuse container comprising a body and a hinged lid attached to said body; said body comprising a top section having a substantially square cross section and said hinged lid having a conforming square shape; said body further comprising a bottom section having a round cross section, wherein said body progressively changes from square to round cross section to form said top and bottom sections; said bottom section having a semi-spherical lower surface with a raised hump in the center of said semi-spherical surface; the inner surface of said body being free of any corners or edges in the bottom section.

6. The container as set forth in claim 5, further comprising a downwardly depending side wall outside said bottom section, extending beyond said bottom section, said side wall having a lower rim forming a stable support for said container.

7. The container as set forth in claim 6, further comprising a pair of wheels attached to said downwardly depending side wall, one wheel on each side of said bottom section.

* * * * *